J. T. LEONARD.
METAL WINDOW FRAME.
APPLICATION FILED FEB. 17, 1911.

1,008,042.

Patented Nov. 7, 1911.

Witnesses:
William H. Mohr
Ynes Scharfer

Inventor:
John T. Leonard.
by Andrew Wilson.
Attorney.

UNITED STATES PATENT OFFICE.

JOHN T. LEONARD, OF WOODCLIFF, NEW JERSEY.

METAL WINDOW-FRAME.

1,008,042.　　　　　Specification of Letters Patent.　　Patented Nov. 7, 1911.

Application filed February 17, 1911. Serial No. 609,202.

*To all whom it may concern:*

Be it known that I, JOHN T. LEONARD, a citizen of the United States and of the State of New Jersey, residing at Woodcliff, New Jersey, have invented certain new and useful Improvements in Metal Window-Frames, of which the following is a specification.

My invention relates to means for detachably attaching the stops or guide rails for the sashes to metallic window frames, and consists in the particulars hereinafter set forth.

Figure 1:
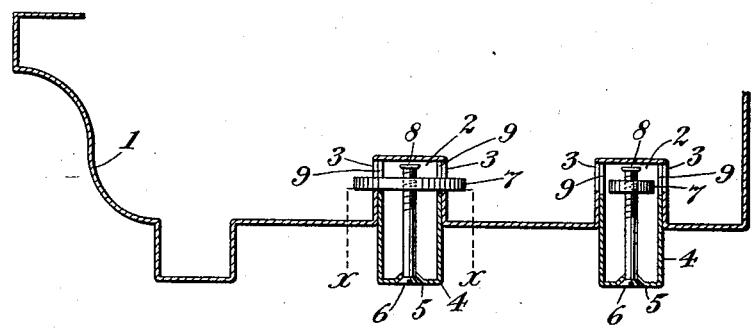
Figure 2:
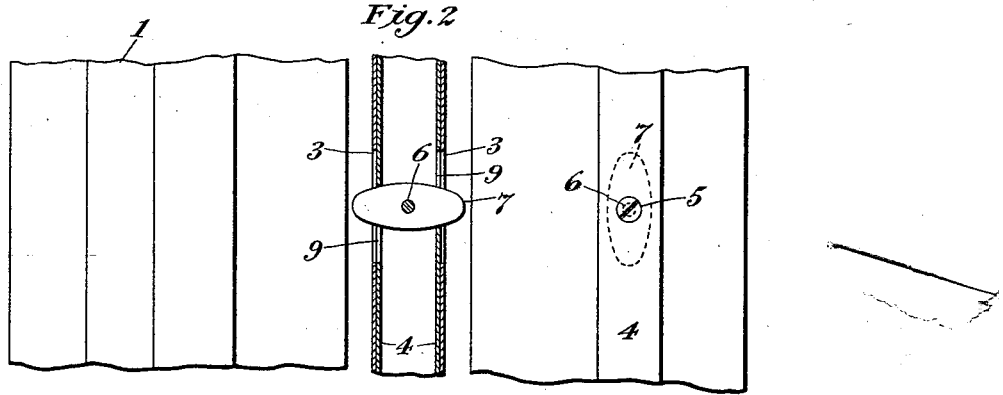
Figure 3:
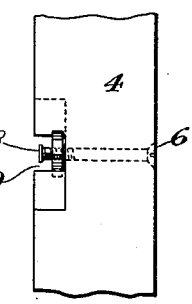

In the drawings Figure 1 is a cross-sectional view of one side of a sheet metal window frame embodying my improved sash stops; Fig. 2 is a front view of a portion of such window frame, the same being broken away on the lines X X of Fig. 1, and Fig. 3 is a side view of a stop and lock, showing the lock turned transversely of the stop.

Similar reference numerals indicate corresponding parts in all the figures.

A sheet metal window frame 1, the back portion of which is omitted, is provided with longitudinal grooves or recesses 2, 2, having holes or openings 3, 3, in their sides, and being adapted to receive the sheet metal stops 4, 4, which have suitable openings at 5, 5, to admit threaded bolts 6, 6, which pass through elongated locking nuts 7, 7, and are preferably enlarged or expanded at their ends 8, 8, to prevent the locking ends from being run off. The stops 4, 4, are provided in their sides with openings 9, 9, on opposite sides of each bolt 6, but located diagonally in reference thereto so that when the nut 7 is turned from left to right its ends may enter the openings and the nut may be turned transversely of the stop 4, as shown in the center of Figs. 1 and 2. When the nut reaches this position it will be stopped by the edges of the openings 9, 9, which prevent its turning further.

In attaching the stops to the window frame the bolts 6, 6, are drawn out through the nuts 7, 7, until the nuts are near the ends of the bolts, as shown at the right of Figs. 1 and 2. The stop is then slipped into position in its groove 2, the openings 9, 9, in the stop coming opposite to the holes 3, 3, in the sides of the groove 2. The bolts 6, 6, are then turned causing their nuts 7, 7, to assume the transverse position, as shown at the center of Figs. 1 and 2, with their ends passing out through the openings 9, 9, in the stop and the openings 3, 3, in the frame, and being held in that position by the ends of the openings 9, 9, as above explained. The bolts 6, 6, are then screwed in through the nuts, drawing them snugly against the bottoms of the openings 3, 3, so as to form a bridge and securely lock the stop in position.

When it is desired to remove the stops the bolts 6, 6, can be unscrewed, which will turn the nuts 7, 7, out of the openings 9, 9, and 3, 3, and longitudinally of the stop, and the stop can be then withdrawn from its groove in the frame.

It will be understood that the stop can be provided with as many of these bolt clamps distributed along it as may be found desirable for securely attaching it to the frame This system of fastening is simple and effective; the stops can be readily applied or removed by any ordinary workman, skilled labor not being required and latitude being allowed for adjustment by making the openings 3, 3, so long that a reasonable longitudinal adjustment of the stops may be permitted without the nuts 7, 7, reaching the ends of the openings 3, 3.

This construction permits the window sashes to be readily taken out or replaced without injury to the frame or stops and without the exercise of that care and nicety of adjustment which are requisite when the stops are secured by screws or bolts passing through them and tapped into permanent seats in the inside of the frame.

Having thus described my invention, what I claim and desire to secure by Letters Patent of the United States, is:—

1. The combination with a metal window-frame, provided with a sash-stop recess therein having openings in the sides thereof, of a guttered sash-stop, a bolt passing inward therethrough, a fastener carried by and permanently attached to said bolt and rotatable thereby and narrower in one direction than the sash-stop recess, to allow its insertion thereinto, and openings diagonally opposite to each other in the sides of said stop to permit said fastener to be turned into but not beyond a position transverse thereto.

2. The combination with a metal window-frame, provided with a sash-stop recess therein having openings in the sides thereof, of a hollow sash-stop, a bolt passing therethrough and provided with a solid enlarged, integral inner end, a fastener formed of an elongated nut narrower in one direction than the sash-stop recess, to allow its insertion thereinto, and being carried by said bolt and rotatable thereby, and openings diagonally opposite to each other in the sides of said stop to permit said fastener to be turned into but not beyond a position transverse thereto.

JOHN T. LEONARD.

Witnesses:
HOWARD M. ROWE,
WILLIAM H. MOHR.

Copies of this patent may be obtained for five cents each, by addressing the "Commissioner of Patents, Washington, D. C."